Jan. 27, 1970  P. E. TOMSHANY  3,491,634
PROCESS FOR SEPARATING SHEETS OF RIGID MATERIAL
Filed Nov. 6, 1967
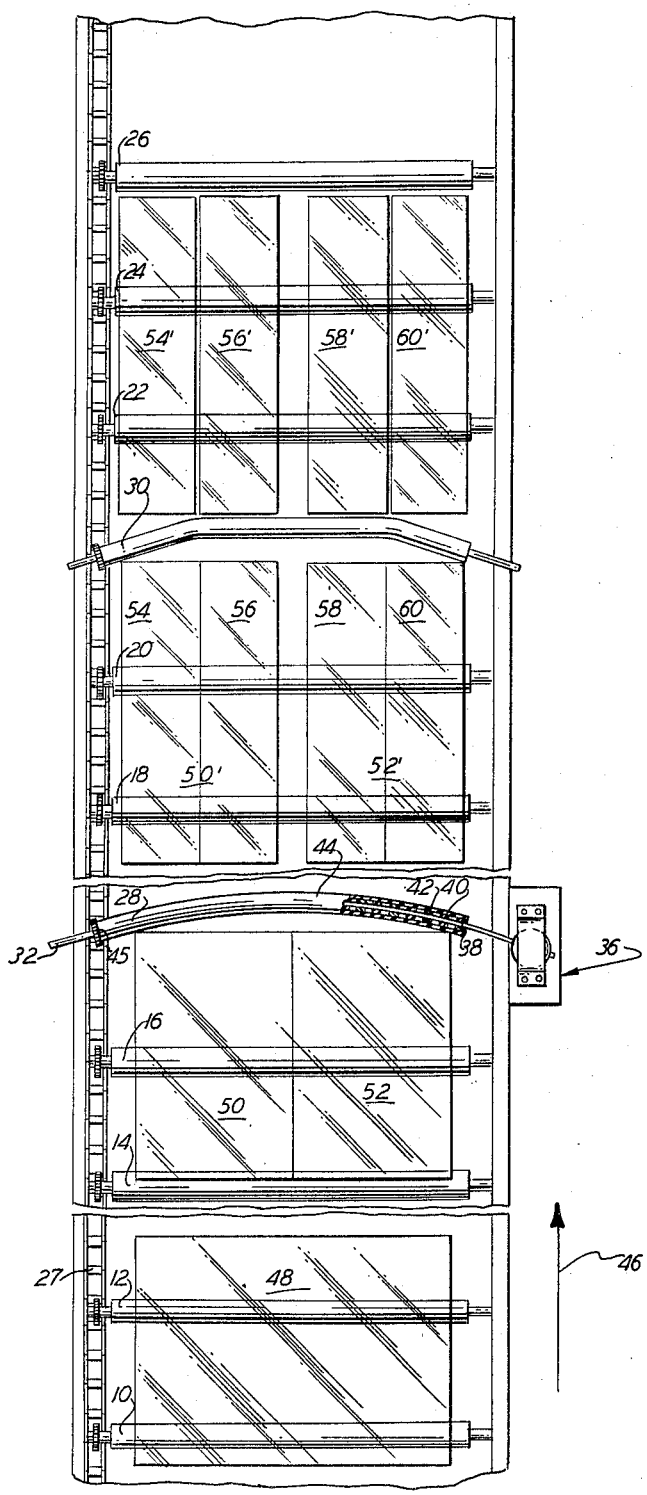
PAUL E. TOMSHANY
INVENTOR
BY John R. Faulkner
Glenn S. Arendsen
ATTORNEYS

United States Patent Office 3,491,634
Patented Jan. 27, 1970

3,491,634
PROCESS FOR SEPARATING SHEETS OF RIGID MATERIAL
Paul E. Tomshany, Dexter, Mich., assignor to Ford Motor Company, Dearborn, Mich., a corporation of Delaware
Filed Nov. 6, 1967, Ser. No. 680,681
Int. Cl. B26d 7/06
U.S. Cl. 83—27    3 Claims

ABSTRACT OF THE DISCLOSURE

A bowed conveyor roll is included among a plurality of conventional straight conveyor rolls to laterally separate glass sheet moving side by side down the conveyor. The separation prevents contact between the adjacent edges of the glass sheets and permits conveying numerous glass sheets side by side on a single conveyor. A subsequent bowed roll having high curvature in its end portions with reduced curvature in its center portion laterally separates sheets on the sides of the conveyor.

SUMMARY OF THE INVENTION

The most economical method of producing glass results in a continuous ribbon of glass approximately 150 to 200 inches wide. As the ribbon is conveyed through the glass fabricating plant it is first cut laterally into successive sheets having the length desired in the final product. Subsequently each sheet is cut longitudinally one or more times until a sheet having the proper width is obtained. In fabricating vehicle window glass, for example, as many as eight longitudinal cuts are necessary, and future plans specifying increased ribbon widths will increase the number of longitudinal cuts considerably.

Immediately after each longitudinal cutting, the glass sheets must be separated laterally to prevent any contact at the adjacent edges during subsequent conveying. Early separating techniques included wedges positioned below each cutting mechanism to slide the glass sheets away from each other. Any misalignment of the glass sheets with the wedge caused serious difficulties, however, and it was generally desirable to use transfer conveyor sections to move one of the glass sheets to a separate conveyor immediately after cutting. Such arrangements required an increased capital investment and used large amounts of floor space and power, especially where several longitudinal cuts were necessary.

This invention provides a process for laterally separating sheets of glass on a single conveyor that requires minimal installation and operation cost. The process comprises locating a conveyor roll at an angle other than perpendicular to the conveying direction of the conveyor. Preferably the angled conveyor roll extends substantially across the conveyor means and is bowed in a downstream direction. The bowed roll is driven, and as the glass sheets pass over the bowed roll, it imparts an increment of force thereto that has a component in a direction perpendicular to the conveying direction. That component moves the sheet a predetermined distance in the lateral direction and thereby separates the side by side sheets.

BRIEF DESCRIPTION OF THE DRAWING

The drawing shows a plan view of a conveyor section having two bowed conveyor rolls for separating a single piece of glass into four smaller sheets on the same conveyor line. The curvature of the bowed rolls is exaggerated in the drawing and the cutting mechanisms have been removed for clarity.

DETAILED DESCRIPTION

Referring to the drawing, the conveyor section contains a plurality of straight conveyor rolls 10, 12, 14, 16, 18, 20, 22, 24 and 26. Rolls 10 through 26 extend laterally across the conveyor and are driven by a conventional electric motor (not shown) through a chain 27 located below the rolls and meshing with sprockets attached to the rolls.

A bowed conveyor roll 28 is positioned between rolls 16 and 18 and a second bowed conveyor roll 30 is positioned between rolls 20 and 22. Bowed roll 28 comprises a shaft 32 rigidly fastened at each end through a ball and socket arrangement, one of which is indicated by numeral 36. Shaft 32 generally is a relatively supple bar of steel. Loosely mounted on shaft 32 are a plurality of short sleeves, three of which are represented by numerals 38, 40 and 42. The sleeves are covered by a boot 44 of rubber or other flexible material to form a uniform surface along the length of the roll. Boot 44 is connected to a sprocket 45 at one end, and sprocket 45 meshes with chain 27. The sleeves, boot and sprocket are rotatable on shaft 32.

Roll 28 is bowed with a substantially constant radius of curvature across its length. Roll 30 is constructed similarly to roll 28 except it has a sharper radius of curvature near its ends than in its center portion. This is provided by spacing the sleeves in the center portion more closely together than the sleeves at the edges, for example.

The glass moves along the conveyor section in the direction of arrow 46 (i.e., rolls 28 and 30 are bowed in a downstream direction). Initially, the continuous ribbon (not shown) is cut laterally into large sheets of glass, one of which is represented by numeral 48. In the broken out conveyor section between rolls 12 and 14, sheet 48 is cut by conventional apparatus into two smaller sheets 50 and 52 traveling side by side. As sheets 50 and 52 pass over bowed conveyor roll 28 each is moved outwardly a predetermined distance to the positions shown for sheets 50′ and 52′, thereby preventing any contact between the facing edges of the sheets during subsequent conveying.

Between roll 28 and roll 18 a second longitudinal cutting operation divides sheets 50′ and 52′ into sheets 54, 56, 58 and 60. Sheets 56 and 58 have been separated slightly by roll 28 but sheets 54 and 56 are very close together as are sheets 58 and 60. As the four sheets pass over bowed conveyor roll 30, sheet 54 is moved outwardly by a slightly greater increment than sheet 56 and sheet 60 similarly is moved outwardly a slightly greater distance than sheet 58. As the sheets leave roll 30 they have the approximate positions represented by sheets 54′, 56′, 58′ and 60′ where each is laterally separated from the others by a distance sufficient to prevent contact between sheets during subsequent conveying.

Generally the radius of curvature of the bowed rolls is relatively small. In a typical installation, for example, a roll about 180 inches in length has its center displaced downstream only about 3 inches. Roll 30 has approximately the same amount of curvature for about the first 30 inches of each end, with the curvature in the center portion corresponding to a displacement of about ½ inch over 120 inches of length. The teeth of the sprockets fastened to rolls 28 and 30 are relatively narrow compared to the openings in chain 27 so the slight misalignment does not affect the driving relationship of the chain to the sprockets. Variations in the amount of bow can be affected by applying inwardly directed forces to the ends of the shafts. Adjustments can be provided on shaft 32 and the corresponding shaft of roll 30 to position the bowed rolls slightly above the plane of the straight rolls to assure contact between the glass sheets and the bowed rolls.

Thus this invention provides a process for laterally separating sheets of glass on a moving conveyor section with minimal equipment costs and space requirements. The process can be built into most existing glass conveyors and operates continuously instead of intermittently.

What is claimed is:

1. In a process for producing smaller sheets of rigid glass from a substantially continuous ribbon of the rigid glass in which the ribbon is first cut laterally into a series of larger sheets and then cut longitudinally into smaller sheets while traveling on a conveyor means that includes a plurality of straight conveyor rolls, the improvement comprising locating a bowed conveyor roll downstream of the longitudinal cutting step, said conveyor roll being bowed in a downstream direction and having its upper surface slightly above the horizontal plane of the upper surfaces of the straight conveyor rolls immediately adjacent thereto and driving said bowed conveyor roll so contact between the bowed conveyor roll and the smaller sheets imparts an increment of movement to the smaller sheets in a direction perpendicular to the conveying direction, said increment of movement laterally separating the smaller sheets from each other.

2. In a process for producing smaller sheets of glass from a substantially continuous ribbon of the glass in which the ribbon is first cut laterally into a series of larger sheets and then cut longitudinally into smaller sheets while traveling on a conveyor means, the improvement comprising locating a conveyor roll downstream of the longitudinal cutting step, said conveyor roll extending substantially across the conveyor means and being bowed in a downstream direction, locating a second bowed conveyor roll downstream of the previously mentioned conveyor roll, said second conveyor roll having a smaller radius of curvature at its end portions than its center portion, and driving the bowed conveyor rolls so contact between the bowed conveyor rolls and the smaller sheets imparts an increment of movement to the smaller sheets in a direction perpendicular to the conveying direction and away from adjacent glass sheets.

3. The process of claim 2 comprising positioning the bowed conveyor rolls so the upper surfaces thereof are slightly above the horizontal plane of the upper surfaces of the conveyor means to insure contact between the glass sheets and the bowed conveyor rolls.

References Cited

UNITED STATES PATENTS

| | | | |
|---|---|---|---|
| 1,810,677 | 6/1931 | Pfeiffer | 83—102 X |
| 3,072,353 | 1/1963 | Moser | 83—105 X |
| 3,190,518 | 6/1965 | Insolio | 225—96.5 |
| 3,279,664 | 10/1966 | Lynch | 225—96.5 |
| 3,345,895 | 10/1967 | Patterson | 83—105 |

WILLIAM S. LAWSON, Primary Examiner

U.S. Cl. X.R.

83—45, 105; 198—34; 225—96.5